United States Patent
Carlson et al.

(10) Patent No.: US 9,628,535 B2
(45) Date of Patent: Apr. 18, 2017

(54) DATA STREAMING INFRASTRUCTURE FOR REMOTE EXECUTION IN A CONSTRAINED ENVIRONMENT

(75) Inventors: David G. Carlson, Rochester, MN (US); Jeffrey S. McAllister, Portland, OR (US); Nelson Ramirez, San Antonio, TX (US)

(73) Assignee: International Business Machines Corporation, Armonk, NY (US)

( * ) Notice: Subject to any disclaimer, the term of this patent is extended or adjusted under 35 U.S.C. 154(b) by 1354 days.

(21) Appl. No.: 13/087,558

(22) Filed: Apr. 15, 2011

(65) Prior Publication Data
US 2012/0265890 A1   Oct. 18, 2012

(51) Int. Cl.
*H04L 29/06* (2006.01)
*G06F 15/173* (2006.01)

(52) U.S. Cl.
CPC ...... *H04L 65/602* (2013.01); *G06F 15/17318* (2013.01); *H04L 65/607* (2013.01); *H04L 65/4069* (2013.01)

(58) Field of Classification Search
CPC .............. G06F 15/17318; H04L 65/607; H04L 65/602; H04L 65/4069
USPC ......................................................... 709/231
See application file for complete search history.

(56) References Cited

U.S. PATENT DOCUMENTS

| | | | |
|---|---|---|---|
| 8,055,970 B1 * | 11/2011 | Smith et al. ................... | 714/752 |
| 8,074,043 B1 * | 12/2011 | Zeis .............................. | 711/171 |
| 2004/0024897 A1 * | 2/2004 | Ladd et al. .................... | 709/231 |
| 2005/0254519 A1 * | 11/2005 | Beukema et al. ............ | 370/468 |
| 2006/0150189 A1 * | 7/2006 | Lindsley ........................ | 718/105 |
| 2008/0005392 A1 * | 1/2008 | Amini et al. .................... | 710/29 |
| 2008/0307121 A1 | 12/2008 | Chen et al. | |
| 2009/0031175 A1 * | 1/2009 | Aggarwal et al. .............. | 714/47 |
| 2009/0112802 A1 * | 4/2009 | Srinivasan et al. ............... | 707/3 |
| 2009/0300615 A1 * | 12/2009 | Andrade et al. .............. | 718/100 |
| 2009/0313614 A1 * | 12/2009 | Andrade et al. .............. | 717/151 |
| 2010/0088673 A1 | 4/2010 | Chen et al. | |
| 2011/0047555 A1 * | 2/2011 | Lakshmanan et al. ........ | 718/105 |

(Continued)

OTHER PUBLICATIONS

US Patent Application entitled, "Demand-Based DMA Issuance for Execution Overlap" filed by David G. Carlson on Apr. 15, 2011.

(Continued)

*Primary Examiner* — Philp Chea
*Assistant Examiner* — Wing Ma
(74) *Attorney, Agent, or Firm* — Middleton Reutlinger

(57) ABSTRACT

A method, apparatus, and program product stream data between a host element and a target element in a parallel computing system. The method comprises partitioning data used to perform a task into a plurality of data streams based at least in part upon data associated with the task and partitioning a data stream into a plurality of data stream views based at least in part on a memory size associated with a target element configured to process the data stream. The method further comprises sequentially communicating at least a portion of the data stream views to the target element via a data streaming infrastructure implemented on at least a host element and the target element, wherein the portion of the data streaming infrastructure on the host element transfers the portion of the data stream views to the portion of the data streaming infrastructure on the target element.

23 Claims, 13 Drawing Sheets

(56) References Cited

U.S. PATENT DOCUMENTS

2011/0093854 A1* 4/2011 Blanc et al. .................. 718/101
2011/0208872 A1* 8/2011 Liddell et al. ................ 709/231

OTHER PUBLICATIONS

Zhan Bokai et al., "TCP/IP Offload Engine (TOE) for an SOC System," Institute of Computer & Communication Engineering, National Cheng Kung University, Nios II Embedded Processor Design Contest—Outstanding Designs 2005.

Peng Wu et al., "An Integrated Simdization Framework Using Virtual Vectors," International Conference on Supercomputing, Jun. 21, 2005.

U.S. Patent and Trademark Office, Office Action issued in related U.S. Appl. No. 13/087,570, dated Jan. 30, 2012.

* cited by examiner

DATA STREAMING INFRASTRUCTURE FOR REMOTE EXECUTION IN A CONSTRAINED ENVIRONMENT

FIELD OF THE INVENTION

The invention is generally related to computing systems, and more particularly to executing tasks in a parallel computing system.

BACKGROUND OF THE INVENTION

Computing technology has advanced at a remarkable pace, with each subsequent generation of computing system increasing in performance, functionality, and storage capacity, often at reduced cost. However, despite these advances, many scientific and business applications still demand massive computing power, which can only be met by high performance computing systems. One particular type of computing system architecture that is often used in high performance applications is a parallel computing system.

One type of a parallel computing system includes a host element that sends data to or receives data from a plurality of accelerator, or "target", elements. For example, the host element generally includes a processor, portion thereof, or processing node that determines whether to send and what data to send to the target elements, which are also generally a processor, portion thereof, or processing node. These parallel computing systems often provide benefits in acceleration, which is the act of off-loading computationally intensive functions to the target elements. However, acceleration only provides a benefit if the data processed by the target elements can be moved to and from that target element efficiently. Moreover, target elements often have environment constraints. Both of these complicate the design of conventional applications, which must take into account the size of the data to move to and from the target elements, as well as any environmental constraints. This, in turn, often adds to the development and execution costs for conventional applications, as well as prevents the applications from being reused on other platforms.

Moreover, any stored data required by an application is typically moved to local memory of the host element to later be used by a target element. It is thus often desirable to overlap the retrieval of new data with execution of previously retrieved data to avoid I/O delays. However, depending on the computational complexity of a given application, it is generally difficult to perform such overlap. For example, computational requirements and data access patterns of the application, host element, or target elements are subject to change. As such, what may be optimal data retrieval at one point is sub-optimal at a second point. Moreover, environments of different parallel computing systems vary in pipelines available to retrieve data, memory available to store retrieved data, the number of target elements, and/or other resources that may be used to execute the application. As such, generic mechanisms to retrieve data may overload one type of parallel computing system while being underutilized for another type of parallel computing system. In turn, this may lead to additional latencies or wasted resources.

Consequently, there is a continuing need to more efficiently and accurately configure applications across a parallel computing system. Moreover, there is a continuing need to more efficiently and accurately overlap data retrieval and application execution in a parallel computing system.

SUMMARY OF THE INVENTION

Embodiments of the invention include a method, apparatus, and program product to address execution of an application across a parallel computing system using a data streaming infrastructure. In particular, embodiments of the invention provide a data streaming infrastructure that is configured across a host element and one or more target elements of the parallel computing system. The host element operates by determining, from the application, what tasks to perform. The tasks, or portions thereof, are then defined as input data streams and/or output data streams. The data streams, in turn, include a plurality of data stream views. The data stream views are portions of a data stream that can be processed by a target element. The size of the data stream views is controlled such that the memory required for a data stream view of a data stream, or the memory required for a set of related input and output data stream views of respective data streams, is less than or equal to the memory available on a target element configured to process the data stream views.

The data streaming infrastructure may be configured as an application layer in the host and target elements. As such, a portion of the data streaming infrastructure in a target element may cooperate with a portion of the data streaming infrastructure in the host element to transfer data stream views of a data stream for that target element until that data stream has been processed. The data stream views of a data stream can be either discrete with respect to one another or utilize the data from a preceding data stream view during processing. As such, the data stream views may be "overlapped" with respect to one another.

In one embodiment consistent with the invention, a method of streaming data between a host element and a target element in a parallel computing system is provided. The host element partitions data used to perform a task into a plurality of data streams based at least in part upon data associated with the task and also partitions a data stream from the plurality of data streams into a plurality of data stream views based at least in part on a memory size associated with the target element configured to process the data stream. The host element also communicates at least a portion of the plurality of data stream views to the target element via a data streaming infrastructure implemented on at least the host element and the target element. In that embodiment, a first portion of the data streaming infrastructure configured on the host element transfers the portion of the plurality of data stream views to a second portion of the data streaming infrastructure configured on the target element.

These and other advantages will be apparent in light of the following figures and detailed description.

DETAILED DESCRIPTION

Figure 1:
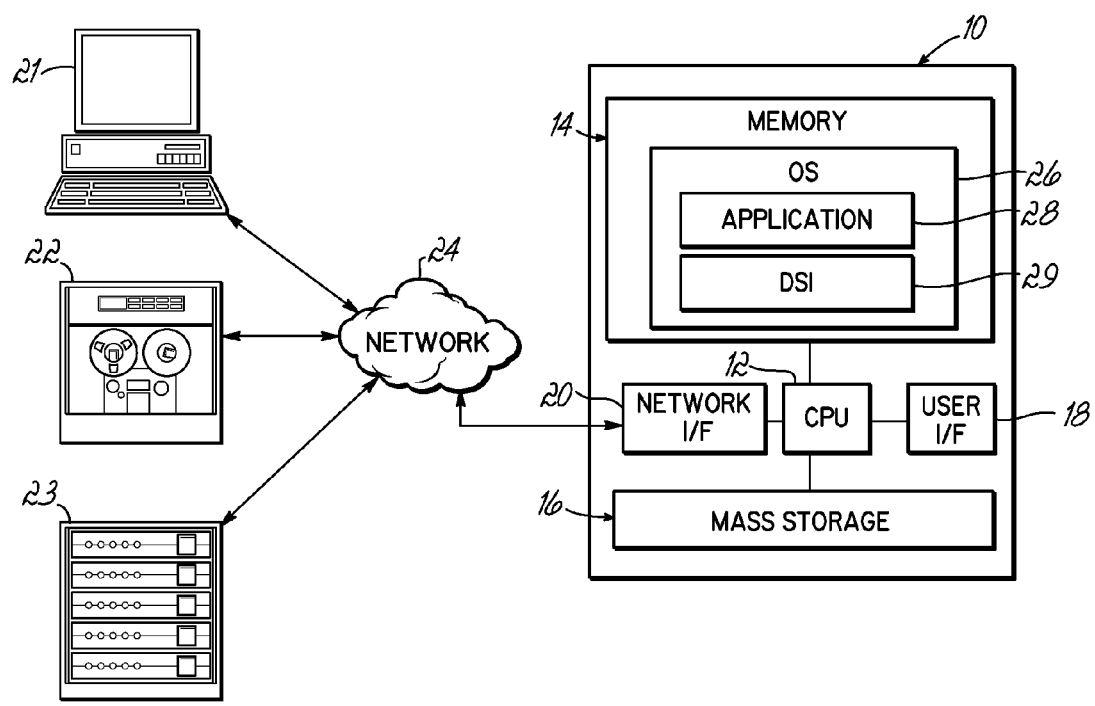
FIG. 1 is a diagrammatic illustration of one embodiment of a parallel computing system that includes a host element and at least one target element consistent with embodiments of the invention.

Embodiments of the invention include a method, apparatus, and program product to address execution of an application across a parallel computing system using a data streaming infrastructure. Embodiments of the invention also include a method, apparatus, and program product to retrieve data using direct memory ("DMA") requests to overlap that retrieval with the execution of at least a portion of a task by a target element.

The data streaming infrastructure is configured across a host element and one or more target elements of the parallel computing system. The host element operates by determining, from the application, what tasks to perform. The tasks, or portions thereof, are then defined as input data streams or output data streams. The data streams, in turn, each include a plurality of data stream views. The data stream views are portions of a data stream that can be processed by a target element. The size of the data stream views is controlled such that the memory required for a set of data stream views of a data stream (e.g., a data stream view of an input data stream and a data stream view of an output data stream), or the memory required for multiple sets of data stream views, is less than or equal to the memory available on a target element configured to process the data stream views.

The data streaming infrastructure may be configured as an application layer in the host and target elements. As such, a portion of the data streaming infrastructure in a target element may cooperate with a portion of the data streaming infrastructure in the host element to transfer data stream views of a data stream for that target element until that data stream has been processed. The data stream views of a data stream can be either discrete with respect to one another (such that they do not utilize data from a preceding data stream view during processing, or utilize overlapped data from a preceding data stream view during processing).

The parallel computing system may also be configured to overlap the execution of a first input data stream (e.g., which may include a first portion of a task or a first task) with the retrieval of data required for execution of a second input data stream (e.g., which may include a second portion of a task or a second task). As such, a target element is configured to analyze the first and second data streams to determine whether any DMA requests for views required for execution thereby are necessary. If not, which may occur in the case when all views required for execution of a portion of a data stream are stored locally to the target element, the data stream is immediately executed. However, if one or more DMA requests are required, the target element determines whether to create a buffer group to track that one or more DMA requests. When a buffer group is created, the one or more DMA requests are made to the host element for the views necessary and tracked in that buffer group. Otherwise, the data stream may be temporarily skipped or otherwise remain unprocessed. In specific embodiments, the buffer groups may be processed sequentially (e.g., a first data stream has a first buffer group associated with a first set of DMA requests, while a second data stream has a second buffer group associated with a second set of DMA requests that are issued after the first set of DMA request). The DMA requests themselves may be issued asynchronously.

Turning to the drawings, wherein like numbers denote like parts throughout the several views, FIG. 1 illustrates a hardware and software environment for one embodiment of a parallel computing system 10. Computing system 10, for purposes of this invention, may represent any type of computer, computer system, computing system, server, disk array, or programmable device such as multi-user computers, single-user computers, handheld devices, networked devices, mobile phones, gaming systems, etc. Computing system 10 may be implemented using one or more networked computers, e.g., in a cluster or other distributed computing system. Computing system 10 will be referred to as "computer" for brevity sake, although it should be appreciated that the term "computing system" may also include other suitable programmable electronic devices consistent with embodiments of the invention.

Computer 10 typically includes at least one processing unit 12 (illustrated as "CPU") coupled to a memory 14 along with several different types of peripheral devices, e.g., a mass storage device 16, a user interface 18 (including, for example, user input devices and a display), and a network interface 20. The memory 14 may be comprised of dynamic random access memory (DRAM), static random access memory (SRAM), non-volatile random access memory (NVRAM), persistent memory, flash memory, and/or another digital storage medium. Mass storage device 16 may also be a digital storage medium, including at least one hard disk drive, and may be located externally to computer 10, such as in a separate enclosure or in one or more networked computers 21, one or more networked storage devices 22 (including, for example, a tape drive), and/or one or more other networked devices 23 (including, for example, a server). Computer 10 may communicate with the networked computer, networked storage device 22, and/or networked device 23 through a network 24.

As illustrated in FIG. 1, computer 10 includes one processing unit 12, which may be a multi-core processing unit (e.g., an OPTERON® dual core processor as distributed by ADVANCED MICRO DEVICE, INC., "AMD,"® of Sunnyvale, Calif.) or multi-element processing unit (e.g., a CELL BROADBAND ENGINE® processor as jointly developed by INTERNATIONAL BUSINESS MACHINES, "IBM,"® of Armonk, N.Y., SONY® of Tokyo, Japan, and TOSHIBA® of Tokyo, Japan). In alternative embodiments, computer 10 may include a plurality of processing units 12 that may include single-thread processing units or multithreaded processing units (e.g., a POWERPC® microprocessor as distributed by IBM), multi-core processing units, multi-element processing units, and/or combinations thereof. Similarly, memory 14 may include one or more levels of data, instruction and/or combination caches, with caches serving an individual processing unit or multiple processing units as is well known in the art. In some embodiments, Computer 10 may also be configured as a member of a shared or distributed computing environment and communicate with other members of that distributed computing environment through network 24.

The memory 14 of the computer 10 may include an operating system 26 to control the primary operation of the computer 10 in a manner that is well known in the art. In a specific embodiment, the operating system 26 may be a UNIX®-like operating system, such as LINUX®. Memory 14 may also include at least one application 28, or other software program, configured to execute in combination with the operating system 26 and perform a task. The memory 14 may further include at least one program code for a data streaming infrastructure 29 that can be configured across the processor 12 consistent with embodiments of the invention. Other operating systems may be used, such as WINDOWS®, a MAC®-based operating system, or a UNIX-based operating system (e.g., for example, RED HAT®, DEBIAN®, DEBIAN GNU®/LINUX, etc.).

Figure 2:
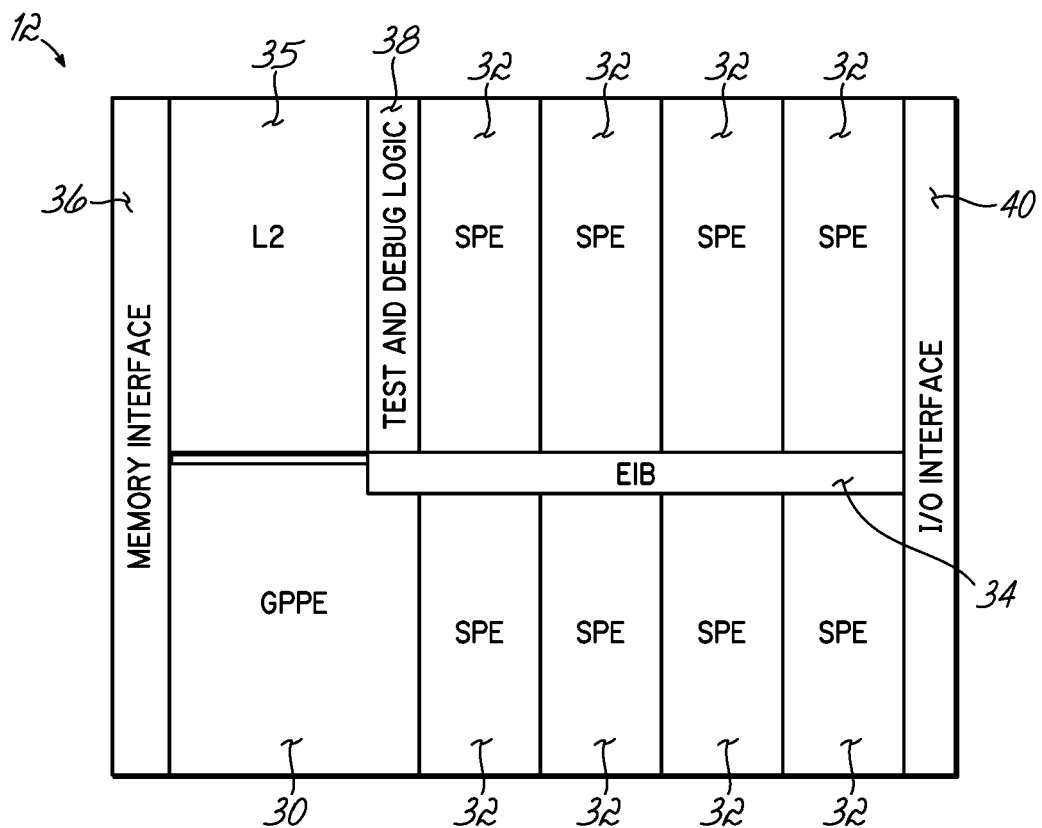
FIG. 2 is a diagrammatic illustration of a multi-element processing unit that may be included in a parallel computing system, and in particular the parallel computing system of FIG. 1.

In one embodiment, the processing unit is a multi-element architecture processor that includes multiple components. FIG. 2 is a diagrammatic illustration of components of a multi-element architecture processing unit 12 that includes at least one general purpose processing element ("GPPE") 30 and a plurality of synergistic processing elements ("SPEs") 32a-h consistent with embodiments of the invention. In the illustrated embodiment of FIG. 2, the architecture of the processing unit 12 is consistent with the architecture of a PowerXCell 8i Cell Broadband Engine processor as distributed by IBM that includes a single GPPE 30 and eight SPEs 32a-h. In alternative embodiments, a processing unit 12 having two or more GPPEs 30 and a greater or lesser number of SPEs 32a-h may be used without departing from the scope of the invention.

The GPPE 30 acts as a controller for each SPE 32a-h. The GPPE 30 may be a single or multithreaded general operations processor configured to communicate with the SPEs 32a-h. In specific embodiments, the GPPE 30 may be a sixty-four-bit Power Architecture core (e.g., such as a Power ISA 2.0× compliant core) with virtual machine extensions ("VMX"), while each SPE 32a-h may be a 128-bit single instruction, multiple data architecture processing element. As such, the GPPE 30 may be used for generating a data stream, generating a plurality of data stream views for the data stream, scheduling the data stream to execute on an SPE 32-h, performing general processing, managing data required for execution by various data streams, and monitoring the progress of operations of the SPEs 32a-h, while also being able to perform virtualization, address translation and protection, and external exception handling. The SPEs 32a-h, on the other hand, may be optimized for efficient data processing and devote most of their resources to computations and executing data stream views. Thus, each SPE 32a-h may be specialized for a specific task. For example, one or more SPEs 32a-h may be designed to function as a graphics engine, an encryption/decryption engine, or a co-processor. Also for example, one or more SPEs 32a-h may be designed for accelerated multimedia processing, or be dedicated to vector, scalar, fixed point, or floating point mathematical calculations.

Each SPE 32a-h may receive a data stream view from the GPPE 30, process that view, and synchronize with the GPPE 30 once execution is complete. SPEs 32a-h may also be configured to engage in stream processing and/or allow explicit scheduling for that SPE 32a-h. Because they are processing elements, each GPPE 30 may be configured with one or more logical caches (e.g., including an L2 cache 35), which is generally much smaller than that of the GPPE 30.

The processing unit 12 includes a specialized high-speed element interconnect bus ("EIB") 34 to interconnect the GPPE 30 and SPEs 32a-h. The EIB 34 may be configured as a circular bus having two channels in opposite directions and connected to a memory interface 36, test and debug logic 38, and an I/O controller 40. Each processing unit 12 may therefore interface with the memory 14, mass storage 16, as well as interfaces 18 and/or 20. The GPPE 30 may load or collect data stream views and/or other instructions for each of the SPEs 32a-h, as well as interface externally through the I/O controller 40 using the EIB 34.

In some embodiments, an application 28 may not be configured with information about the various components of the processing unit 12, including the GPPE 30 and SPEs 32a-h thereof. As such, the GPPE 30 performs management functions for that processing unit and is configured to schedule and manage one or more data streams across that GPPE 30 and/or SPEs 32a-h. However, when an application 28 is configured with information about the various components of the processing unit, the application 28 may supply data for the processing unit 12 to manage the execution progress and scheduling of one or more data streams across the GPPE 30 and/or SPEs 32a-h.

Figure 3:
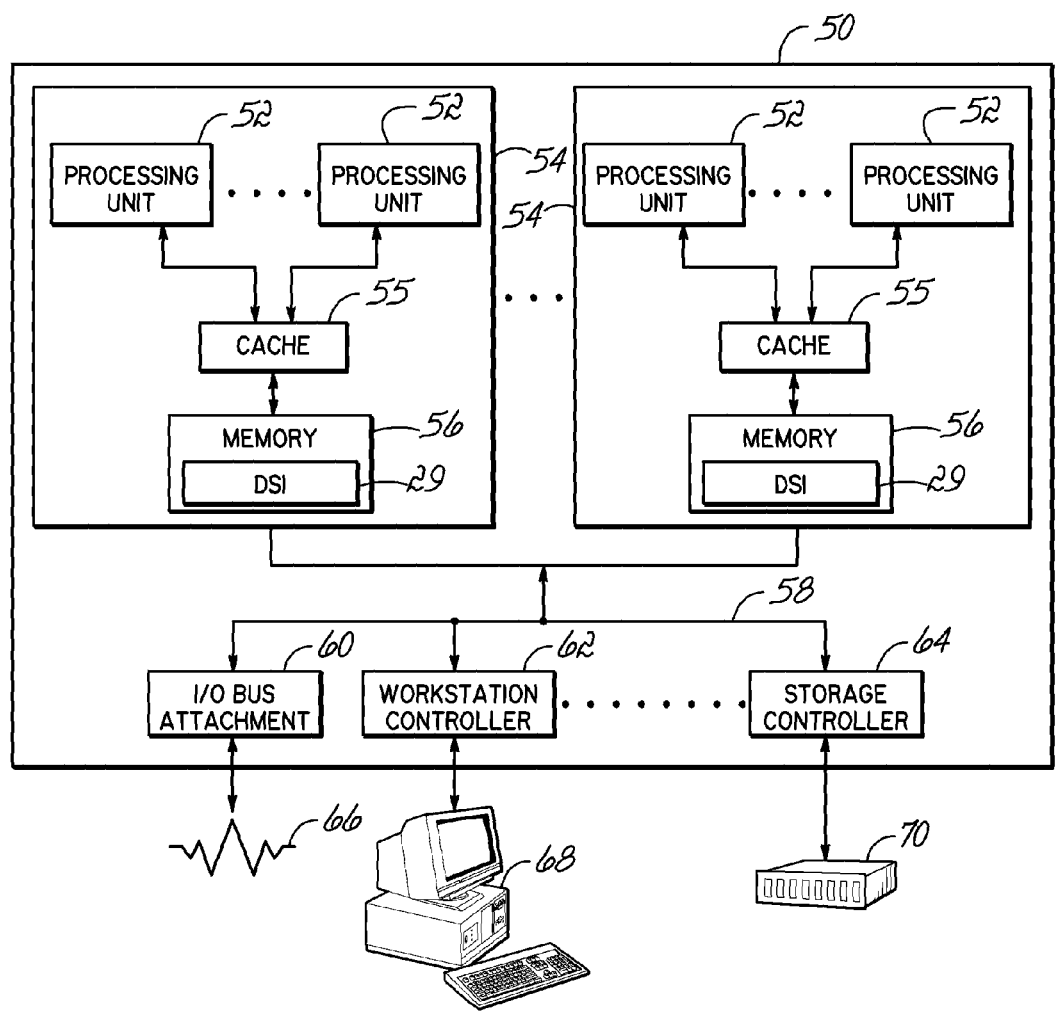
FIG. 3 is a diagrammatic illustration of an alternative embodiment of a parallel computing system that includes a host element and at least one target element consistent with embodiments of the invention.

A data streaming infrastructure may also be implemented on a shared memory or distributed computing system, which may also be a parallel computing system. By way of example, FIG. 3 is a block diagram of a shared memory computing system 50 consistent with embodiments of the invention. Shared memory computing system 50, in specific embodiments, may be a computer, computer system, computing device, server, disk array, or programmable device such as a multi-user computer, a single-user computer, a handheld device, a networked device (including a computer in a cluster configuration), a mobile phone, a video game console (or other gaming system), etc. Shared memory computing system 10 will be referred to as "shared memory computer" 10 for the sake of brevity. One suitable implementation of shared memory computer 10 may be a multi-user computer, such as a computer available from International Business Machines Corporation.

Shared memory computer 10 generally includes one or more processing units 52, such as microprocessors, microcontrollers, and/or other processing elements configured in a computing node 54. Each processing unit 52 is coupled to a memory subsystem that may further include a cache subsystem 55 as well as a main storage 56. The cache subsystem 55 may be comprised of dynamic random access memory ("DRAM"), static random access memory ("SRAM"), flash memory, and/or another digital storage medium that typically comprises one or more levels of data, instruction and/or combination caches, with certain caches serving the processing units 52 in a shared manner as is well known in the art. The main storage 56 may comprise a hard disk drive and/or another digital storage medium. Each processing node 54 may be further configured with an operating system (not shown), application (not shown), and data streaming infrastructure (not shown). The processing units 52 for the shared memory computer 50 may include single-thread processing units, multithreaded processing units, multi-core processing units, multi-element processing units, and/or combinations thereof.

Each node 54 may be coupled to a number of external devices (e.g., I/O devices) via a system bus 58 and a plurality of interface devices, e.g., an input/output bus attachment interface 60, a workstation controller 62, and/or a storage controller 64, which respectively provide external access to one or more external networks 66, one or more workstations 68, and/or one or more storage devices such as a direct access storage device ("DASD") 70. System bus 58 may also be coupled to a user input (not shown) operable by a user of shared memory computer 50 to enter data (e.g., the user input may include a mouse, a keyboard, etc.) and a display (not shown) operable to display data from the shared memory computer 50 (e.g., the display may be a CRT monitor, an LCD display panel, etc.). Shared memory computer 50 may also be configured as a member of a distributed computing environment and communicate with other members of that distributed computing environment through network 66.

Figure 4:
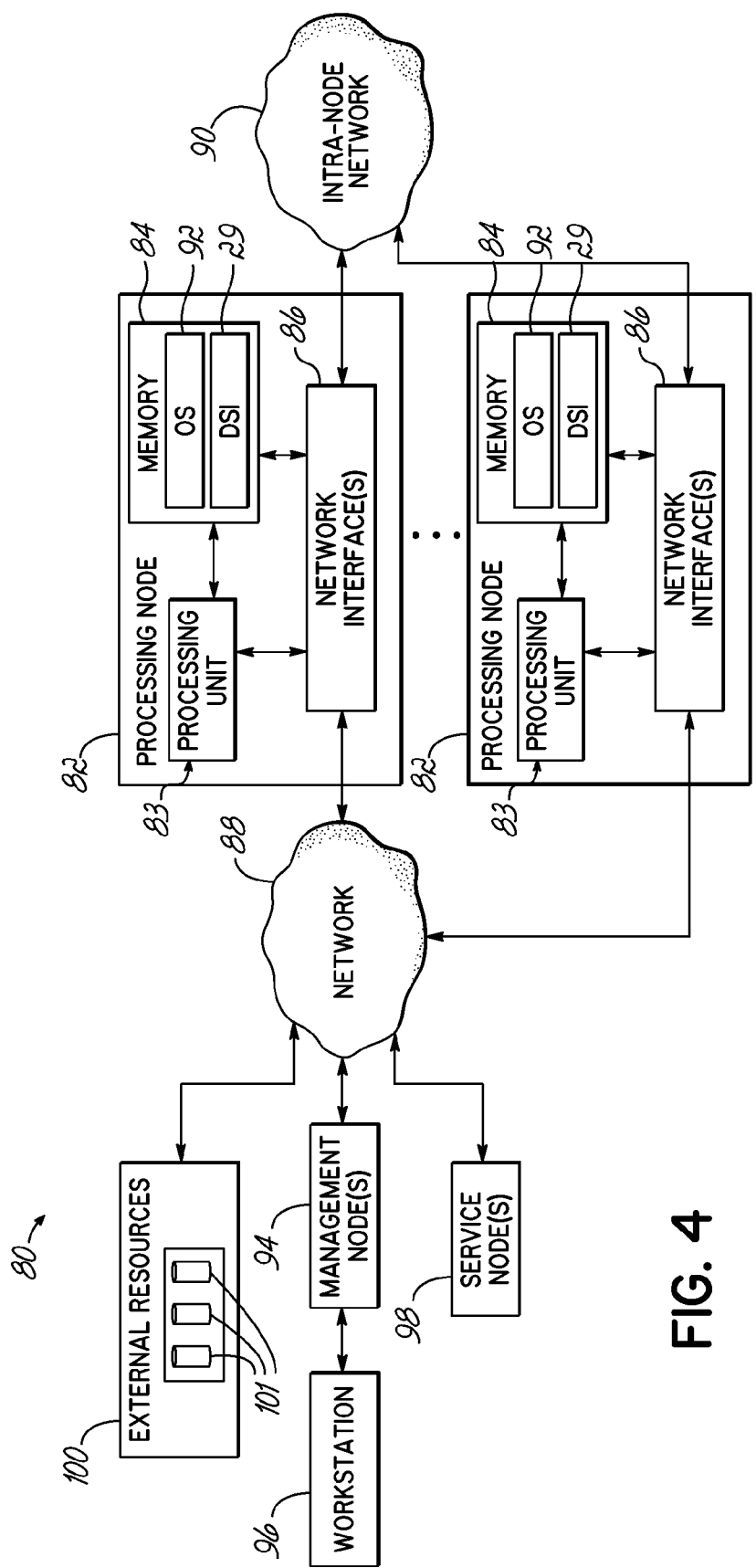
FIG. 4 is a diagrammatic illustration of another alternative embodiment of a parallel computing system that includes a host element and at least one target element consistent with embodiments of the invention.

FIG. 4, on the other hand, is a block diagram of a distributed shared memory computing system 80 consistent with alternative embodiments of the invention. The distributed shared memory computing system 80 (hereinafter "system" 80 for the sake of brevity) may include a plurality of processing nodes 82 that each includes at least one processing unit 83, a memory 84, and a network interface 86. The network interface 86, in turn, may communicate with at least one network 88, 90, and in particular the network interface 86 may be configured to communicate with at least one intra-node network 90 dedicated to communication between the processing nodes 82. Each processing node 82 may be configured with an operating system 92, application (not shown), and data streaming infrastructure 29. In typical embodiments, each of the processing nodes 82 is configured to receive and process at least a portion of a data stream. The processing nodes 42 are thus collectively configured to perform the bulk of the work of the system 80. In some embodiments, however, some processing nodes 82 may be configured as dedicated I/O nodes and thus maintain an interface between a subset, or "group," of processing nodes 82 and the network(s) 88, 90. Moreover, I/O nodes may be operable to perform process authentication and authorization, task accounting, debugging, troubleshooting, booting, and configuration operations as is well known in the art. Thus, the total work for a group of processing nodes 82 may be simplified and additional burdens on each of the group of processing nodes 82 that would be presented by interfacing with the entirety of the processing nodes 82 and the rest of the system 80 are avoided. A processing node 82 may include more than one processing unit 83, and, in specific embodiments, each node 82 may include two or four processing units 83 as is well known in the art. The processing units 83 for the system 80 may include single-thread processing units, multithreaded processing units, multi-core processing units, multi-element processing units, and/or combinations thereof.

The system 80 may include one or more management nodes 94 that may store compilers, linkers, loaders, and other programs to interact with the system 80. The management nodes 94 may be accessed by a user at a workstation 96, which may be controlled by at least one management node 94. Thus, the management nodes 94 may generate a data stream and provide that data stream and associated data stream views to one or more service nodes 98 of the system 80. The management nodes 94 may perform auxiliary functions which, for reasons of efficiency or otherwise, may be best performed outside the processing nodes 82 or service nodes 98. For example, interactive data input, software code editing, software code compiling and/or other user interface functions may be handled by the management nodes 94.

The service nodes 98, on the other hand, may include databases and/or administrative tools for the system 80. The databases may maintain state information for the processing nodes 82, including the current scheduling of data streams and/or views thereof across the processing nodes 82. The administrative tools may control the scheduling and loading of data stream views onto the processing nodes 82, including controlling the pre-processing of a data stream as well as the scheduling and loading of data streams and/or views thereof to one or more processing nodes 82. As such, the service nodes 98 may, in some embodiments, gather one or more processing nodes 82 from the plurality of processing nodes 82 and dispatch at least a portion of a plurality of data stream views of a data stream to that group of processing nodes 82 for execution. Data stream views may be communicated across the network 88 and/or 90 and through the data streaming architecture to a processing node 82. In some embodiments, the functionality of the management nodes 94 and/or service nodes 98 may be combined in a control subsystem operable to receive, manage, schedule, redistribute and otherwise control jobs for the processing nodes 82.

Management nodes 94 and/or service nodes 87 may each include a group of processing nodes 82 and at least one I/O node. In this way, management nodes 94 and/or service nodes 98 may be internally connected to the processing nodes 82 through the intra-node network 90 as well as network 88 (connection not shown). Alternatively, management nodes 94 and/or service nodes 98 may each include of a group of processing nodes 82 and at least one I/O node separate from the system 80 (i.e., the management nodes 94 and/or service nodes 98 may be configured as "stand-alone" nodes). Furthermore, management nodes 94 and/or services nodes 98 may include only one processing node 82 each. One or more external resource servers 100 may be servers accessible over the network 88 and configured to provide interfaces to various data storage devices, such as, for example, hard disk drives 101, optical drives (e.g., CD ROM drives, CD R/RW drives, DVD+/−R/RW drives, Blu-Ray drives, etc.), solid state memory drives, or other I/O devices, resources or components that may be accessed for data and/or to process a task.

In a similar manner as the shared memory computer 50, the memory 84 of each processing node 82 may include a cache subsystem comprised of DRAM, SRAM, flash memory and/or another digital storage medium. Additionally, the memory 84 of each processing node 82 may further comprise a main storage that comprises a hard disk drive and/or another digital storage medium. Also similarly, the cache subsystem may comprise one or more levels of data, instruction and/or combination caches, with certain caches serving the processing units 83 in a shared manner as is well known in the art.

Although one network interface 86 for each node 82 is shown in FIG. 4, each node 82 may include a plurality of network interfaces 86 or other network connections. As such, each node 82 may be configured to communicate through various networks, including the intra-node network 90. For example, each node 82 may communicate to every other node 82 through a torus network. Moreover, various nodes 82 may be custom configured to perform various functions. As such, some nodes 82 of the system 80 may be configured as computing nodes (e.g., to receive data stream views and process those data stream views), I/O nodes (e.g., to manage the communications to and/or from each computing node), management nodes (e.g., to manage the system 80), and/or service nodes (e.g., to monitor the system 80, schedule one or more data streams across the system 80, and/or support the computing or management nodes). As such, and in some embodiments, the system 80 may have an architecture consistent with a BlueGene® parallel computing system architecture as developed by IBM. In alternative embodiments, the system 80 may have an architecture consistent with a RoadRunner parallel computing system architecture as also developed by IBM. Moreover, and in further alternative embodiments, the system 80 may have an architecture consistent with a non-uniform memory access ("NUMA") and/or a cache coherent NUMA ("ccNUMA") computing system as is well known in the art. It will also be appreciated that nodes may be defined at a number of different levels in a multi-level shared memory architecture, and in some embodiments need not be distinguished from one another based upon any particular physical allocation or demarcation. Indeed, in some embodiments multiple nodes may be physically disposed in the same computer, on the same card, or even on the same integrated circuit.

A data streaming infrastructure 29 may be configured on any of the computer 10, shared memory computer 50, or system 80. Specifically, the data streaming infrastructure 29 is configured across a host element and at least one target element, both of which are implemented in physical hardware of the computer 10, shared memory computer 50, or system 80. With respect to computer 10, the host element may include the GPPE 30 of the processing unit 12, while a target element may include a corresponding SPE 32 (e.g., an SPE 32 configured in the same processing unit 12 as a particular GPPE 30). With respect to the shared memory computer 50, the host element may include a first processing unit 52 of a first node 54 while a target element may, correspondingly, include a second processing unit 52 of that first node 54 or a processing unit 52 of a second node 54. Alternatively, the host element may include a first node 54 from the plurality of nodes while the target element includes a second node 54 from the plurality of nodes. With respect to the system 80, the host element may include the management node 94 and/or the service node 98, while a target element may include a processing node 42. When the shared memory computer 50 or the system 80 are configured with a Cell processor such as that illustrated in FIG. 2, one having ordinary skill in the art will appreciate that the host element may also include a GPPE 30 while a target element may include a corresponding SPE 32.

Consistent with embodiments of the invention, the data streaming infrastructure 29 may be implemented as an application layer across a host element and at least one target element. Alternatively, the data streaming infrastructure 29 may be part of the runtime environment of an application (such as application 28). The data streaming architecture, or "DSI," 29 may be responsive to three separate application components of the application 28. These separate components, in turn, may be defined as follows: an "initial( )" component that is called to set up input data streams of one or more target elements, set up output data streams from the one or more target elements, set up data stream views of the input and output data streams, set up buffers, and configure other components and/or operations for the DSI 29; an "execute( )" component that is invoked to stream data stream views to the one or more target elements, process the data stream views, and support the reception of output data from the one or more target elements; and a "final( )" component that is invoked after the last "execute( )" component to wind down the streaming operations, such as allowing the application to have access to results, task switching between the target elements and their corresponding host element, and other actions to conclude execution of the application 28.

In any event, the host element and the target elements execute respective portions of the DSI 29 and communicate therethrough. A portion of the DSI 29 configured on the host element (e.g., the "host DSI") configures data from the application 28 into at least one input data stream. Each input data stream is at least a portion of a task defined by the application 28. In turn, each input data stream includes a plurality of data stream views. Each data stream view is a portion of the data stream that has been configured to fit within the memory of a target element and be transmitted from the host DSI to a portion of the DSI 29 configured on the target element (the "target DSI"). For example, if a target element has about 128 kB of memory available (e.g., memory available outside of that required to execute the target DSI and account for management of the target element) and includes the context data used to process the data stream (e.g., or more generally the memory available to process or otherwise execute a data stream view), then a set of data stream views for an input and output data stream (e.g., one of each) for that target element may be configured, in combination, to be no larger than about 128 kB. In operation, the host DSI sequentially sends and the target DSI correspondingly receives data stream views to process at least a portion of a respective data stream.

In any event, the host DSI is configured to determine at least one target DSI to communicate with and provide appropriate data stream views and/or data streams to that target DSI. The host DSI associate data stream views with unique identifiers that are in turn associated with the target element for which they are intended. These unique identifiers may include target addresses for the target elements, or, in the case of network connected target elements, network identifiers of the target elements. Once a target element has received information about its data stream (e.g., a data stream view thereof and context data, as required), it can begin processing at least one data stream view thereof.

In some embodiments, the data stream views of an input data stream may be overlapped without having to utilize application specific buffering. When these data stream views are overlapped, a particular data stream view may be processed with reference to at least a portion of the data from a preceding data stream view. The DSI 29 can take that into account when determining the size for data stream views of input and output data streams. For example, a target element may have 128 kB of memory available for data stream views and have two sets therein at any given time, thus having two input data streams and two output data streams. When the data streams are not overlapped, each data stream view may contain about 32 kB of data and the target element may not maintain any data of a previous data stream view. However, when the data stream views are overlapped, a target element may maintain about 4 kB of data associated with a first input data stream view then receive a second input data stream view with about 28 kB of data. This overlapping may be particularly advantageous where a particular task requires relatively adjacent values from a data stream, for example a task to generate values of heat propagation through an object. In that example, the heat of a particular location of the object may be dependent on the heat of an adjacent location of the object. As such, it may be advantageous to know the heat for an adjacent location to the location under analysis. Thus, a portion of a previously processed data stream view may be used to process a current data stream view, and a portion of the current data stream view may be used to process a subsequent data stream view.

The host DSI is configured generate one or more data streams and provide each data stream to one or more target elements. By way of example, the host DSI may generate one data stream and provide the data stream views thereof to a target DSI. Advantageously, if the data stream views are overlapped, use of the DSI 29 results in an efficiency gain as the target element can simply reuse some of the data of the data stream views when necessary for overlap. Alternatively, the host DSI may generate one data stream and provide the data stream views thereof to at least two target elements. For example, when the data stream views of a data stream do not require overlap, the DSI 29 may send a first group of the data stream views of that data stream to a first target element and send a second group of the data stream views of that data stream to a second target element. By way of further example, when a data stream includes discrete sections of data stream views that are not overlapped, the host DSI may group those discrete sections and send a first group to a first target element and send a second group to a second target element.

Also by way of example, the DSI 29 may generate two input data streams and provide the data stream views thereof to one target element. As such, the DSI 29 may configure the data stream views of the two input data streams such that the sum of the size of the data stream views of the data streams for a target element is less than or equal to the available memory for the target element. Specifically, if a target element has about 128 kB of memory available, the data stream views for a first input data stream and a first output data stream may each be about 30 kB while the data stream views for a second input data stream and a second output data stream may each be about 34 kB. In this manner, when the target element processes both input data streams, the available memory is not exceeded by the sum of the size of all the data stream views thereof (e.g., the sum of the size of all the data stream views does not exceed 128 kB). Also for example, the DSI 29 may generate multiple data streams and provide the data stream views thereof to multiple target elements. The data stream views for the multiple data streams in the foregoing examples may also be grouped as discussed above.

In some embodiments, the DSI 29 is further configured to dynamically set up buffers that may be used by the application 28, data streams, or the DSI 29 itself. By way of example, the receipt of data stream views of a data stream may be tracked in buffers before they are processed by a target element. The DSI 29 also allows for dynamic application switching. For example, when a data stream is processed it can be swapped input for output, if required by the application 28, allowing for a chained type operation. Similarly, data to be used by a first data stream can be swapped with data from a second data stream.

In addition to the DSI 29, any of the computer 10, shared memory computer 50, or system 80 may overlap execution of a first task or portion thereof with the retrieval of data required for execution by a second task, or a second portion of the first task. Such functionality may be included with the DSI 29 or operate separately from the DSI 29. With respect to including such functionality in the DSI 29, it may be configured to implement a demand driven mechanism to initiate overlapped direct memory access ("DMA") operations, remote memory access operations, and/or other communication operations that would typically present a performance bottleneck (collectively, "I/O operations"). As such, the DSI 29 tracks whether data required for processing in a particular data stream (e.g., which can include data stream views) is stored locally (e.g., at the host or target element) or whether DMA requests are necessary to retrieve that data. When DMA requests are necessary, the DSI 29 begins those operations by generating those requests and tracks their completion in at least one buffer group object. When the DMA requests for a buffer group object are completed, the DSI 29 may begin sending the data stream views for the data stream associated with that buffer group object or processing the data stream associated therewith.

To overlap the execution of one data stream with the retrieval of data required for another data stream, the DSI 29 is configured to track the I/O operations required for data stream views based upon the target element for which they are intended. For example, if a plurality of data stream views are scheduled for one target element, the DSI 29 is able to proactively manage the I/O operations for a first data stream in a first buffer group object and proactively manage I/O operations for a second data stream in a second buffer group object. The order of buffer group objects for a target element are, in turn, stored in a buffer group list.

The DSI 29 may dynamically determine the number of buffer groups to use to proactively manage I/O operations of data stream views for a target element. For example, if an application is slow, it may be sufficient for only two buffer group objects to allow back-to-back execution of the data streams and/or data stream views thereof. Conversely, if an application is fast, more buffer group objects may be necessary to allow back-to-back execution of the data streams and/or data stream views thereof. Similar operations occur with the output from a target element. When sending processed data back to the host element, the DSI 29 may set up an output buffer for the target element to fill with data stream views.

When a task of an application 28 is split among multiple target elements, the host DSI may wait to output the results of the processing by the multiple target elements to the application 28 until such time as all such target elements have completed their processing. In this way, the application 28 is provided an output stream when all processing is done as opposed to a piecemeal receipt of respective processed portions of the task. Advantageously, this ensures data integrity of the results in the output stream, and thus data integrity of the task of the application 28.

Figure 5:
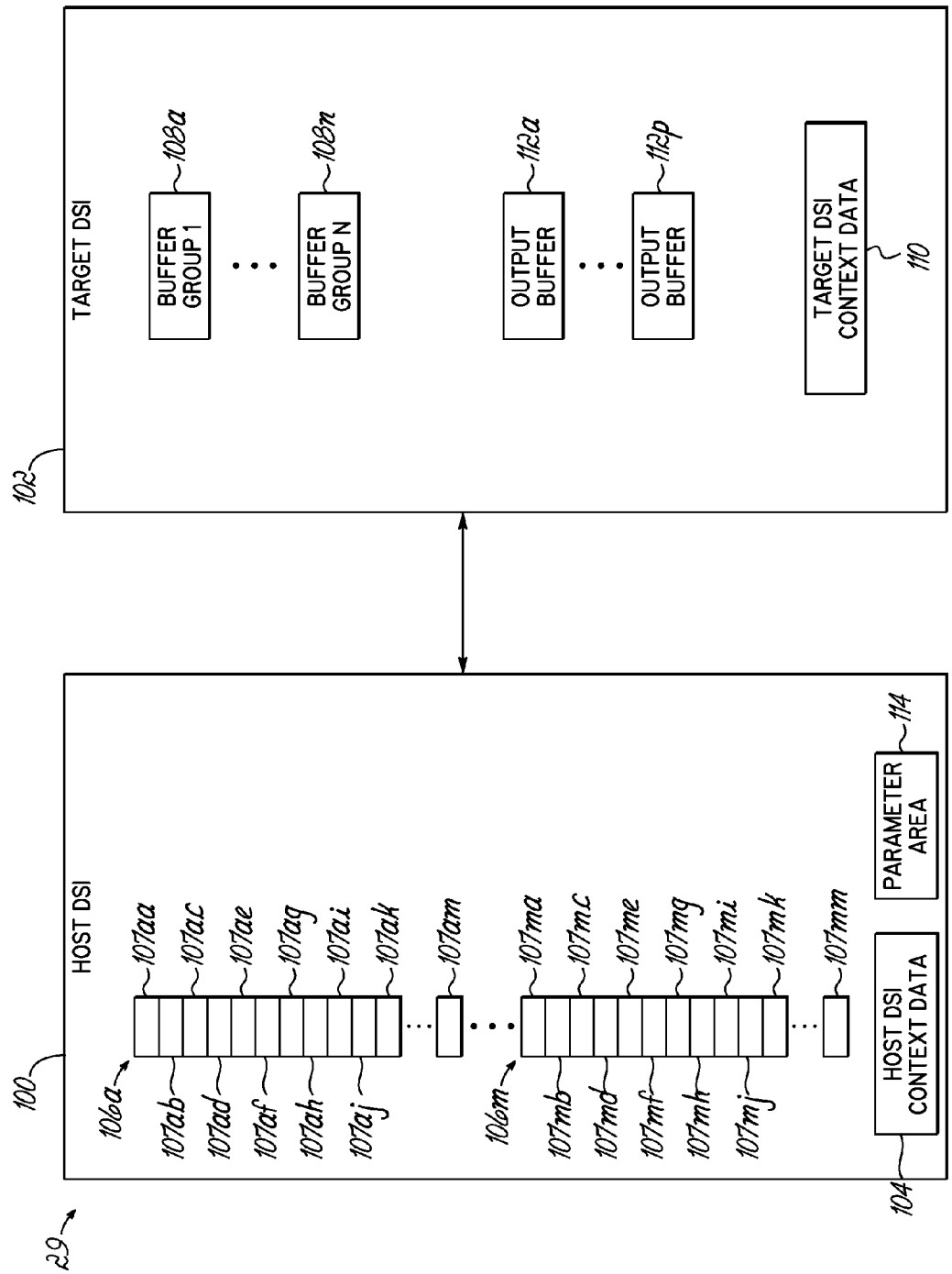
FIG. 5 is a diagrammatic illustration of at least a portion of a data streaming infrastructure configured across the host element and at least one target element of FIG. 1, 3, or 4.

By way of illustration and consistent with embodiments of the invention, FIG. 5 is a diagrammatic illustration of at least some of the components of the DSI 29 that further illustrates the portion of the DSI 29 configured on the host element (illustrated and referred to hereinafter as "host DSI" 100) and the portion of the DSI 29 configured on the target element (illustrated and referred to hereinafter as "target DSI" 102). The host DSI 100 includes host DSI context data 104 that is used by the host DSI 100 to generate data streams and the data stream views thereof. In specific embodiments, the host DSI context data 104 may include information about the computer 10, shared memory computer 50, and/or system 40 upon which the DSI 29 is implemented.

As discussed above, the host DSI 100 is configured to generate, from data associated with the application, at least one data stream 106. As illustrated in FIG. 5, the host DSI 100 has generated a plurality of data streams 106a-n, each of which includes a plurality of data stream views 107. The target DSI 102 is configured to track the I/O operations of a data stream 106 (e.g., the transfer of data stream views) through at least one buffer group 108. As illustrated in FIG. 5, the target DSI 102 utilizes a plurality of buffer groups 108a-n. As also illustrated in FIG. 5, the target DSI 102 has generated a first buffer group 108a for a first portion of a first data stream 106a, and an nth buffer group 108n for an nth data stream 106n.

During operation, the host DSI 100 is configured to stream the data stream views 107 of a data stream 106 from the host DSI 100 to the target DSI 102. In turn, the target DSI 102 includes target DSI context data 110 that is used by the target DSI 102 to receive and/or execute data stream views 107. The target DSI context data 110 may include information about the computer 10, shared memory computer 50, and/or system 80 upon which the DSI 29 is implemented, as well as information regarding how to process the data stream views 107. When one or more data streams views 107 have been processed, they are provided back to the host DSI 100 through one or more output buffers 112a-n. As illustrated in FIG. 5, the host DSI 100 may also configure and include an application specific parameter area 114 that may store data used to execute the application 28 and/or otherwise configure the computer 10, shared memory computer 40, and/or system 80. This application specific parameter area 114 may include data indicating whether and/or when to switch data for data streams as well as data required to execute a data stream.

Those skilled in the art will recognize that the environments illustrated in FIGS. 1-5 are not intended to limit the present invention. In particular, computer 10, shared memory computer 50, and/or system 80 may include more or fewer components consistent with alternative embodiments of the invention. Similarly, one having ordinary skill in the art will recognize that the exemplary environment for a Cell-based architecture illustrated in FIG. 2 is not intended to limit the present invention. For example, one skilled in the art will appreciate that more than one GPPE 30, and more or fewer SPEs 32a-h may be included within other embodiments of an MEP 68. As such, other alternative hardware environments may be used without departing from the scope of the invention. Also for example, the DSI 29 may be configured with more or fewer modules or components and the host DSI 100 may include the buffer group objects 108 and output buffers 112. Additionally, a person having ordinary skill in the art will appreciate that the computer 10, shared memory computer 50, and/or system 80 may include more or fewer applications disposed therein. As such, other alternative hardware and software environments may be used without departing from the scope of embodiments of the invention.

The routines executed to implement the embodiments of the invention, whether implemented as part of an operating system or a DSI, application, component, program, object, module or sequence of instructions executed by one or more processing units will be referred to herein as "computer program code," or simply "program code." The program code typically comprises one or more instructions that are resident at various times in various memory and storage devices in the computer 10, shared memory computer 50, and/or system 80 and that, when read and executed by one or more processing units thereof cause that computer 10, shared memory computer 50, and/or system 80 to perform the steps necessary to execute steps, elements, and/or blocks embodying the various aspects of the invention.

While the invention has and hereinafter will be described in the context of fully functioning computing systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to recordable type media such as volatile and non-volatile memory devices, floppy and other removable disks, hard disk drives, optical disks (e.g., CD-ROM's, DVD's, etc.), among others.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Figure 6:
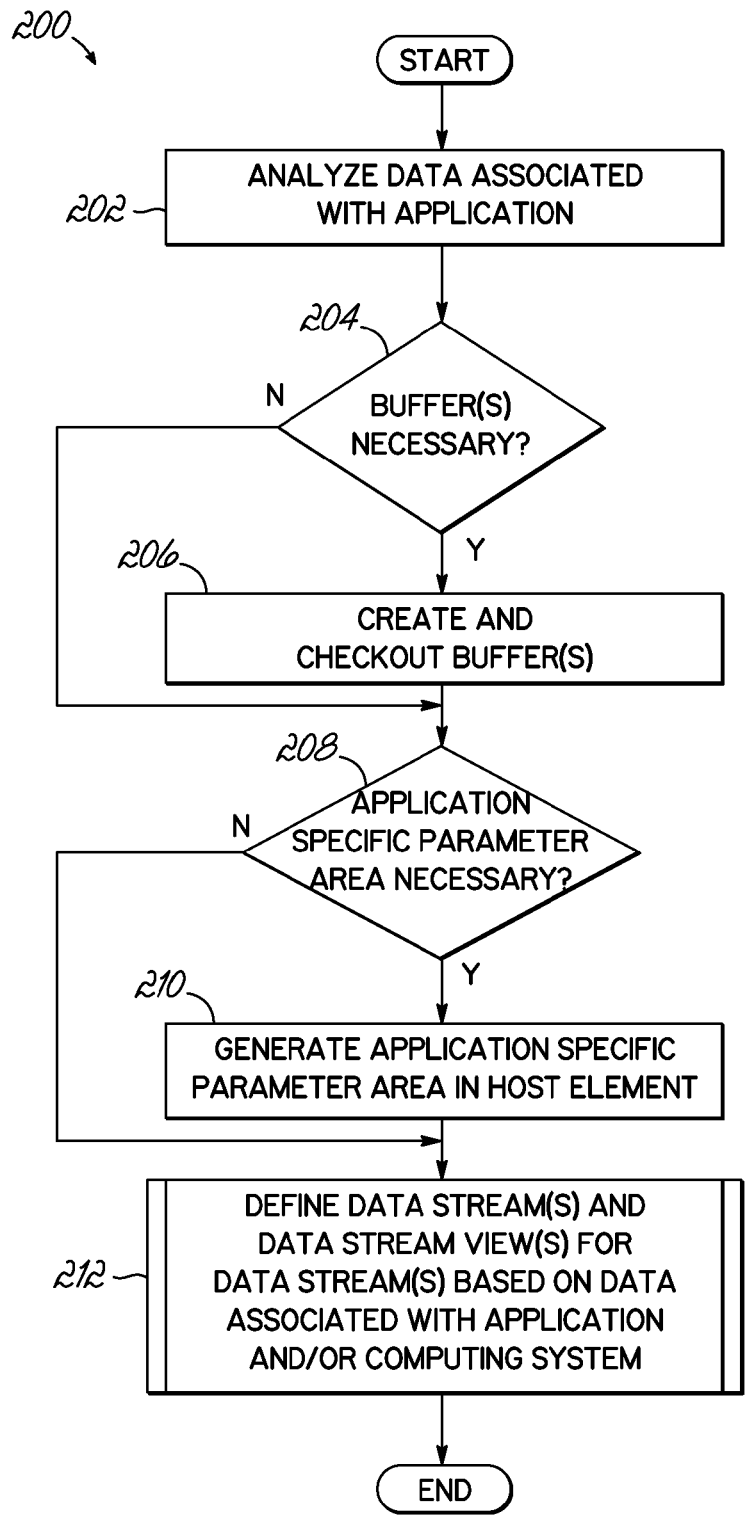
FIG. 6 is a flowchart illustrating a sequence of operations for the host element of FIG. 1, 3, or 4 to configure support components and data streams.

FIG. 6 is a flowchart 200 illustrating a sequence of operations for a portion of a data streaming infrastructure ("DSI") on a host element (referred to hereinafter as a "host DSI") to configure support components and data streams for an application consistent with embodiments of the invention. The host DSI initially analyzes data associated with an application, including one or more tasks defined by the application (block 202), to determine whether buffers and an application specific parameter area are necessary, as well as to determine how to configure the one or more tasks into one or more data streams. As such, the host DSI determines whether an buffers, such as output buffers to store data output by target elements, are necessary (block 204). For example, the output of a processed data stream may include a significant amount of data. Thus, the output of the processed data stream may be stored in one or more output buffers. The host DSI may also check out (e.g., protect) an output buffer to prevent the application from accessing the data in that output buffer. This may be particularly advantageous to prevent the application from accessing data in an access buffer before a data stream associated therewith has completed. Thus, when at least one buffer is necessary ("Yes" branch of decision block 204), the host DSI creates that at least one buffer and may checkout that at least one buffer (block 206).

When at least one buffer is not necessary ("No" branch of decision block 204) or after creating and checking out one or more buffers (block 206), the host DSI determines whether an application specific parameter area is necessary (block 208). In some embodiments, an application may require data that is specific to that application to be stored locally to the host element of the host DSI, such as maintenance data, management data, or other application specific data as required. Thus, when the host DSI determines that an application specific parameter area is necessary ("Yes" branch of decision block 208), the host DSI creates that application specific parameter area in the host element (block 210). When the application specific parameter area is unnecessary ("No" branch of decision block 208) or after creating the application specific parameter area (block 210), the host DSI defines at least one data stream and data stream views therefor based on data associated with the computing system and/or the application executed thereby (block 212). In particular, each data stream may be processed by and scheduled for one or more target elements. The host DSI may set up one or more output data streams that are configured to accept a respective processed data stream after that respective data stream has been processed by the target element. The data stream views for a specific data stream have a size equal to or less than the memory available at the target element for which that specific data stream is scheduled. These data stream views, in turn, may be at least partially overlapped when executed by the target element.

Figure 7:
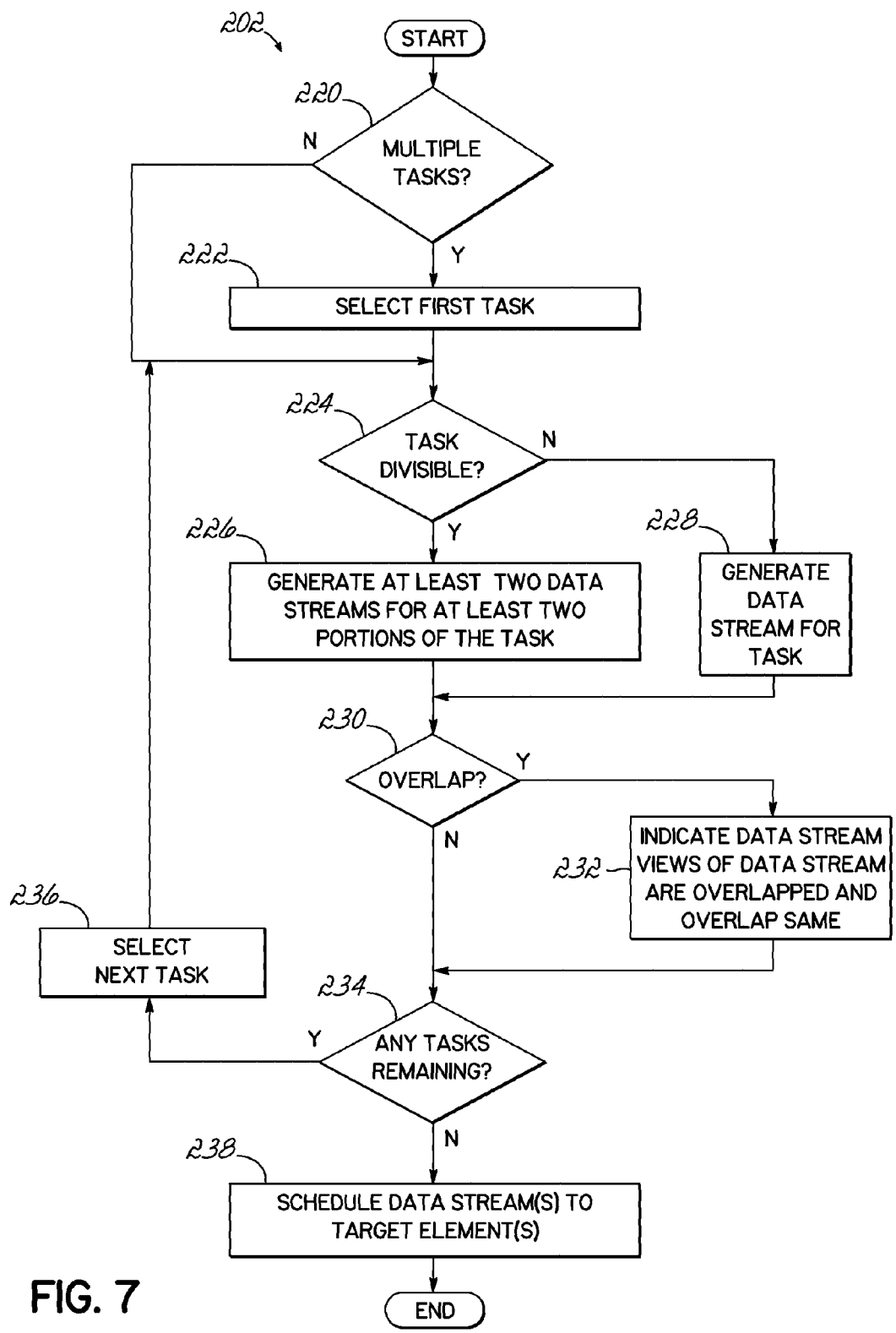
FIG. 7 is a flowchart illustrating a sequence of operations for the host element of FIG. 1, 3, or 4 to generate data stream views of a data stream.

FIG. 7 is a flowchart illustrating a sequence of operations for the host DSI to define data stream views for at least one data stream consistent with block 212 of FIG. 6 and embodiments of the invention. Returning to FIG. 7, the host DSI may initially determine whether an application defines a multitude of tasks that can be processed in parallel (block 220). For example, the application may define several tasks that are interrelated but can be processed in parallel, or define several tasks that are not interrelated but can be processed in parallel. Thus, when an application defines multiple tasks that can be processed in parallel ("Yes" branch of decision block 220), the host DSI selects the first task (block 222). When the application does not define multiple tasks ("No" branch of decision block 220) or after the host DSI selects a task (block 222), the host DSI determines whether the selected task includes discrete portions that can be processed in parallel (e.g., whether the task is "divisible") (block 224). For example, a particular task may include first and second portions that are capable of being processed in parallel and operate to generate data for a third portion. As such, the first and second portions may be configured in respective data streams, with the third portion configured in a third data stream. Thus, when the selected task is divisible ("Yes" branch of decision block 224), the host DSI generates at least two data streams for at least two portions of the task (block 226). However, when the task is not divisible ("No" branch of decision block 224), the host DSI generates a data stream for that task (block 228).

After generating one or more data streams (block 226 or 228), the host DSI determines whether the data stream views of a data stream are overlapped (block 230). When the data stream views of a data stream are to be overlapped ("Yes" branch of decision block 230), the host DSI indicates that the data stream views of that data stream are overlapped and configures the data stream views such that they overlap (block 232). This indication may be a flag for the data stream that is referenced when data stream views for the data stream are created to reduce the size of those data stream views. In response to determining that the data stream views of a data stream are not to be overlapped ("No" branch of decision block 230) or in response to indicating that the data stream views of the data stream are overlapped and configuring them as such (block 232), the host DSI determines whether any tasks defined by the application remain (block 234). When there are remaining tasks to configure ("Yes" branch of decision block 234), the host DSI selects the next task (block 236) and the sequence of operations returns to block 224. However, when there are no remaining tasks to configure ("No" branch of decision block 234), the host DSI schedules the generated data streams to one or more target elements (block 238). Specifically, the host DSI may be configured to spread the workload of the data streams across a plurality of target elements for parallel computing purposes. As such, a target element may be scheduled to process one or more data streams as described below.

Figure 8:
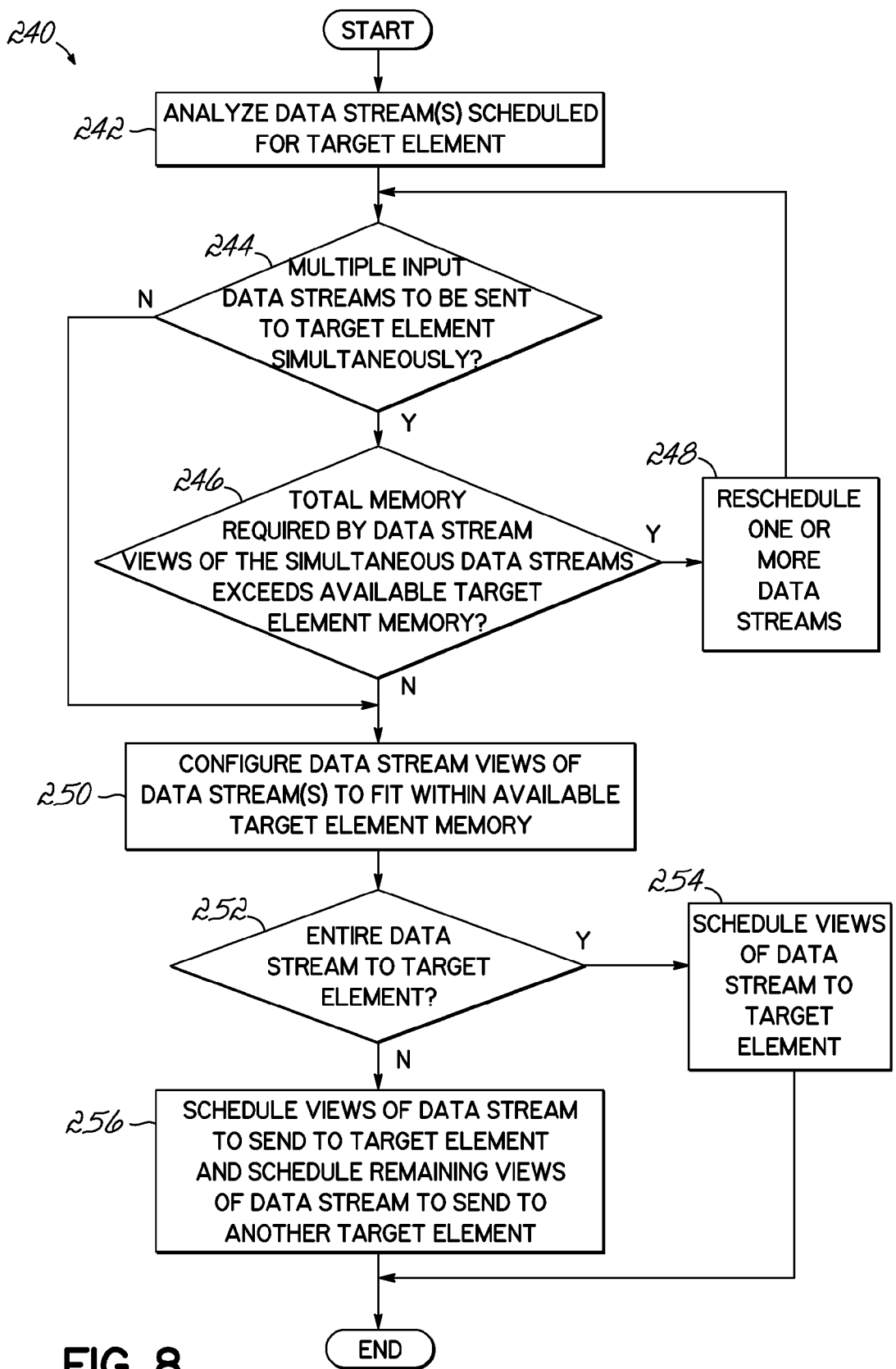
FIG. 8 is a flowchart illustrating a sequence of operations for the host and/or target element of FIG. 1, 3, or 4 to select data stream views of one or more data streams to stream in a data streaming infrastructure.

FIG. 8 is a flowchart 240 illustrating a sequence of operations for a host DSI to schedule data stream views for a data stream to a portion of a DSI configured on a target element (referred to hereinafter as a "target DSI") consistent with embodiments of the invention. The host DSI may analyze the data streams scheduled for a target element (block 242) and determine whether multiple input data streams are simultaneously scheduled to be processed by the target element (block 244). When multiple input data streams are simultaneously scheduled for the target element ("Yes" branch of block 244), the host DSI determines whether the total size of the data stream views of the multiple input data streams simultaneously scheduled for the target element exceeds the available memory of the target element (block 246). For example, certain tasks may require that input data stream views be of a particular size. Thus, if the views for a first stream are a first size and the views for a second input data stream area second size, and the sum of the first and second sizes is smaller than the available memory of the target element, the two input data streams may be scheduled, and thus processed, simultaneously. However, if the sum of the first and second sizes is larger than the available memory of the target element, at least one of the input data streams must be scheduled to a different target element, or the two input data streams must be scheduled such that they are not processed simultaneously for the same target element.

As such, if the size of the views of the multiple input data streams simultaneously scheduled for the target element exceeds the available memory of the target element ("Yes" branch of decision block 246), the host DSI reschedules one or more of those input data streams (e.g., to another target element, or to the same target element but in such a way that the multiple input data streams are no longer simultaneously scheduled) (block 248) and the sequence of operations returns to block 244. However, when multiple input data streams are not simultaneously scheduled for the target element ("No" branch of decision block 244) or when the total memory required for data stream views of the multiple input data streams simultaneously scheduled for a target element do not exceed the available memory of the target element ("No" branch of decision block 246), the host DSI configures the data stream views of the input data streams to fit within the available target element memory (block 250). In particular, the host DSI may specify the size for each data stream view of each input data stream scheduled for the target element with respect to the size of the available memory of the target element and whether the data stream views of each input data stream are overlapped.

After configuring data stream views for one or more input data streams (block 250), the host DSI determines whether to stream the entirety of each input data stream to the target element (block 252). For example, each input data stream may be capable of being subdivided further into portions thereof. As such, when an input data stream is to be sent in its entirety (e.g., not split into two or more portions and/or not split and scheduled to two or more target elements) ("Yes" branch of decision block 252), the host DSI may schedule the data stream views for that input data stream to the target element, and more particular the target DSI (block 254), and the sequence of operations may end. However, when the host DSI determines that the input data stream is not to be sent in its entirety ("No" branch of decision block 252), the host DSI selects data stream views of the input data stream to schedule to the target element and schedules the remaining data stream views of the input data stream for a second target element (block 256).

Figure 9:
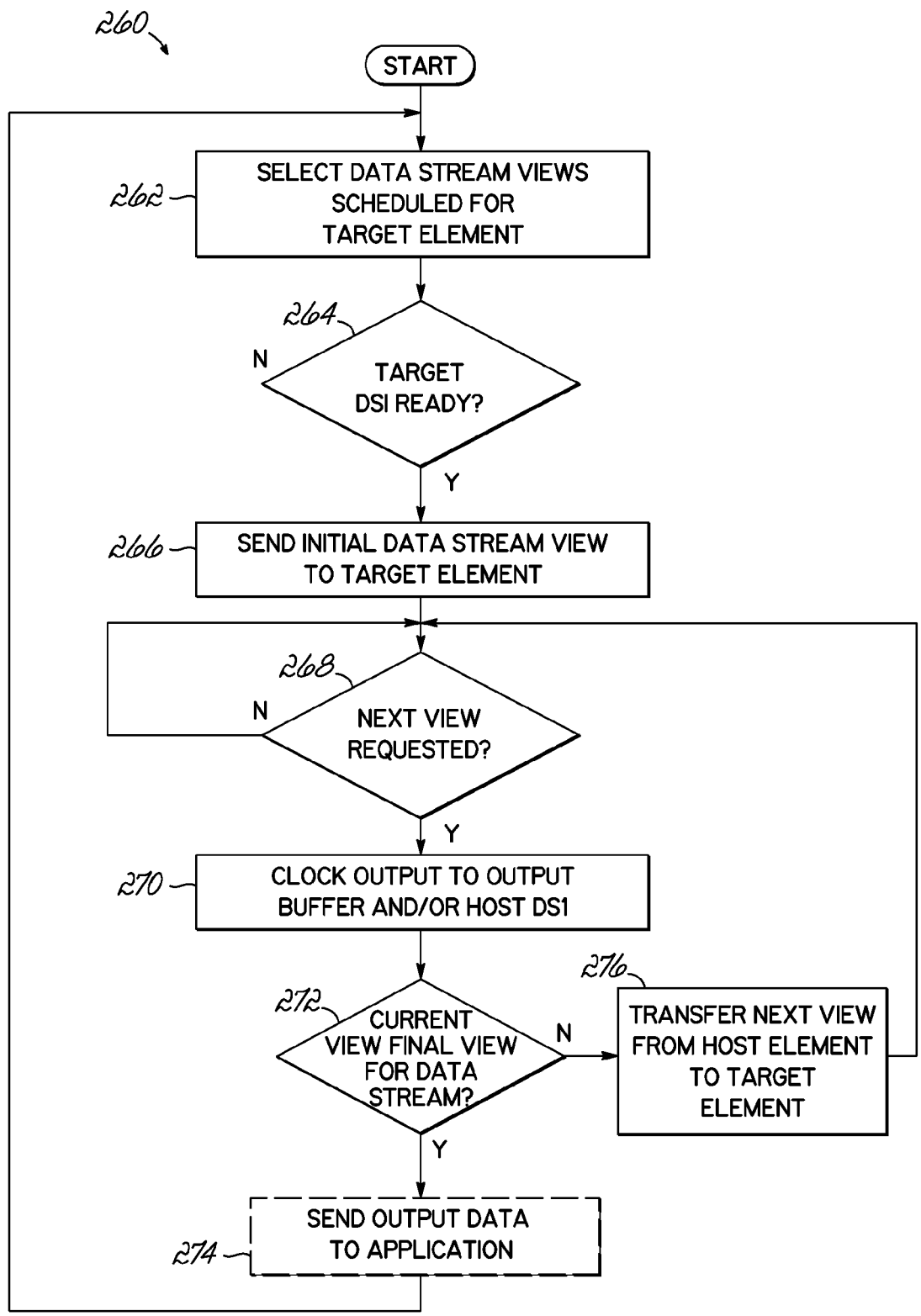
FIG. 9 is a flowchart illustrating a sequence of operations for the host and/or target element of FIG. 1, 3, or 4 to stream data stream views of one or more data streams in a data streaming infrastructure.

FIG. 9 is a flowchart 260 illustrating a sequence of operations for a host DSI to sequentially stream data stream views of a data stream to a target DSI consistent with embodiments of the invention. The host DSI initially selects the data stream views for a target element (block 262) and determines whether the target DSI is ready to receive the views (block 264). When the target DSI is not ready to receive the selected views (e.g., when the target element and/or target DSI are busy or otherwise unavailable) ("No" branch of decision block 264), the sequence of operations may return to block 264. However, when the target DSI is ready to receive the views of the selected data stream (e.g., when the target element and/or target DSI have requested a data stream view) ("Yes" branch of decision block 264), the host DSI streams the initial data stream view to the target DSI (block 266) and determines whether the target DSI has requested the next data stream view (block 268). For example, the target DSI may notify the host DSI when it is ready for the next data stream view of the data stream. As such, when the host DSI receives that notification it determines that the target DSI is ready for the next view ("Yes" branch of decision block 268) and may wait for the target DSI to clock the output of processing the current data stream view to an output buffer and/or to the host DSI (block 270). The host DSI then determines whether the current data stream view that was most recently streamed is the final data stream view for the data stream (block 272). When the current data stream view is the final data stream view for the data stream ("Yes" branch of decision block 272), the host DSI may, in an optional operation, send the output data from the target DSI to the application (block 274) and the sequence of operations may return to block 262. Alternatively, and not shown, the host DSI may stream the output data to the target element or another target element in a last-in-first-out manner. Returning to block 272, when the current data stream view is not the final data stream view for the data stream ("No" branch of decision block 272), the host DSI transfers the next data stream view of the data stream to the target element (block 276).

Figure 10:
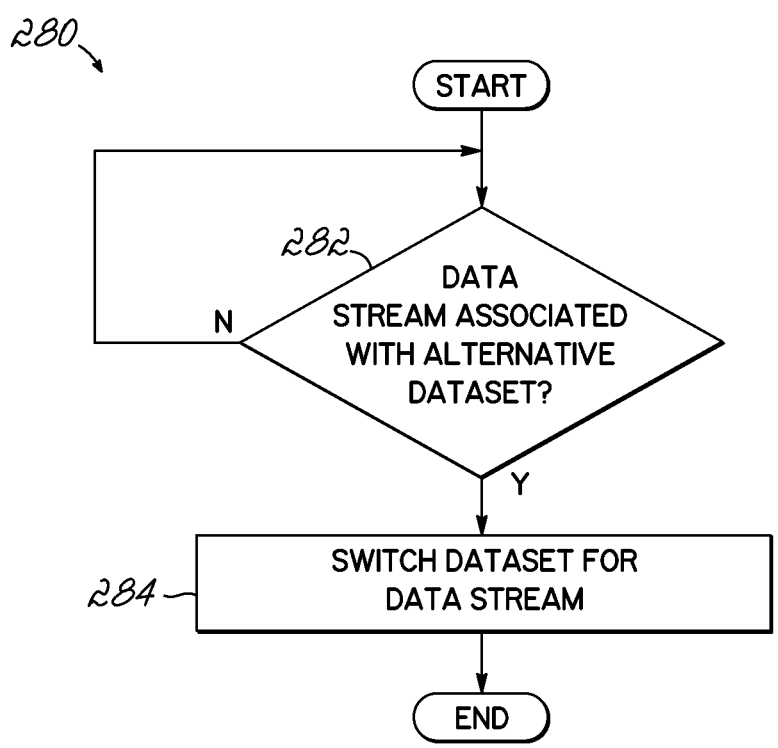
FIG. 10 is a flowchart illustrating a sequence of operations for the host and/or target element of FIG. 1, 3, or 4 to switch datasets for use by a data stream.

FIG. 10 is a flowchart 280 illustrating a sequence of operations for a host DSI to switch datasets for a target element consistent with embodiments of the invention. Specifically, it may be advantageous to switch a target element from a first dataset (e.g., data for a data stream) to a second dataset. For example, a particular data stream may utilize multiple different datasets. As such, the host DSI may switch the data stream between those datasets as necessary. Also for example, a particular data stream may require a sub-process at a particular point in its execution, with the sub-process being defined in a second data stream. As such, the host DSI may switch a target element from the first data stream to the second data stream. Still further, and also for example, the output of a first data stream may be used as the input of a second data stream, or input for subsequent execution of the first data stream. Switching between datasets or data stream may also be advantageous in simulation applications where the resulting output data of a first data stream becomes the input data of a second data stream. Thus, as the host DSI streams data stream views of a data stream to the target element, it determines whether the data stream is associated with an alternative dataset (block 282). In some embodiments, the host DSI determines whether a data stream is associated with an alternative dataset with reference to a data stream descriptor in an application specific parameter area indicating as such. Alternatively, the host DSI determines whether a data stream is associated with an alternative dataset with respect to other data associated with the data stream. In any event, when the host DSI determines that the data stream is not associated with an alternative dataset ("No" branch of decision block 282), the sequence of operations returns to block 282. However, when the host DSI determines that the data stream is associated with an alternative dataset ("Yes" branch of decision block 282), the host DSI switches the dataset for the data stream (block 284).

Figure 11:
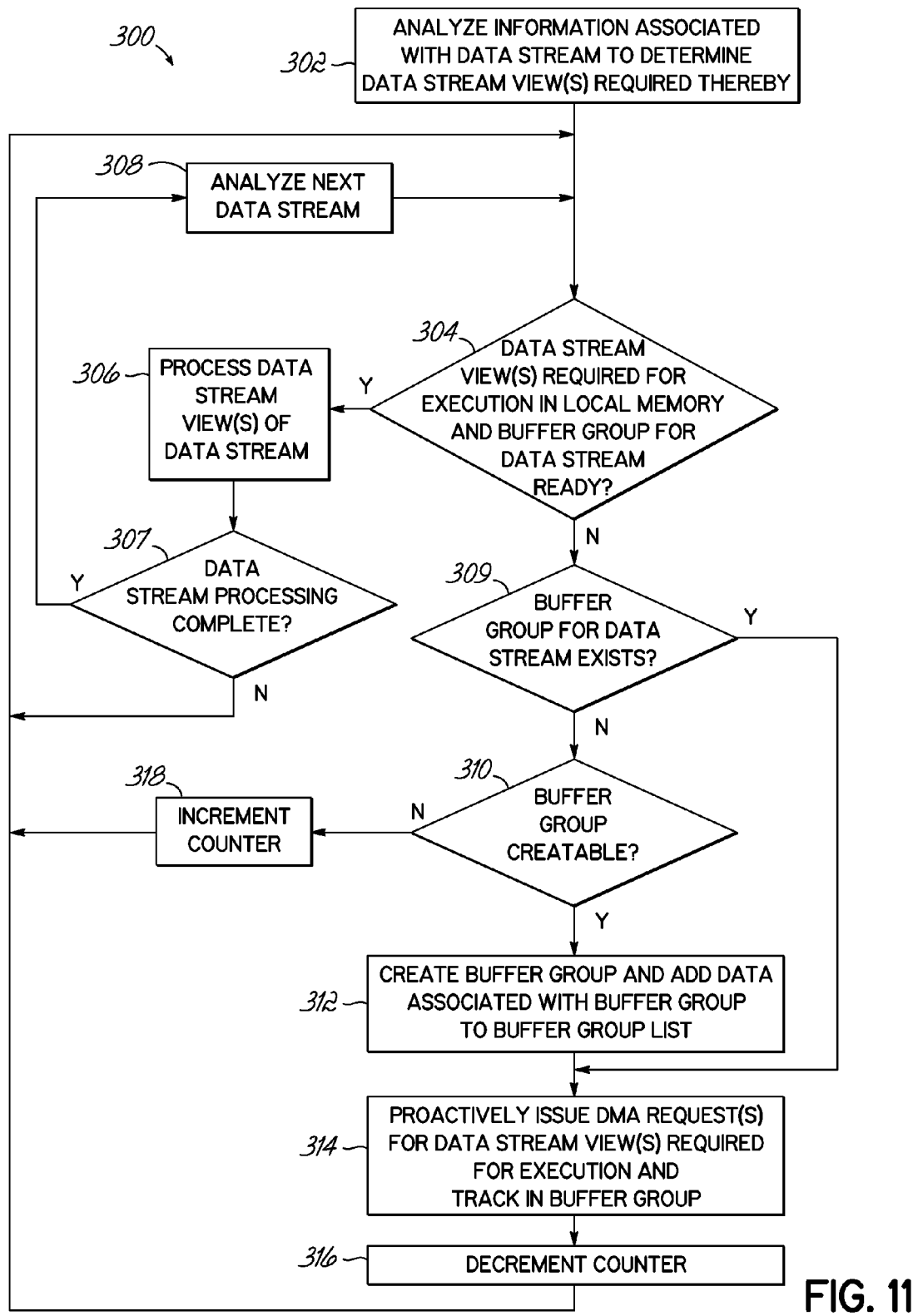
FIG. 11 is a flowchart illustrating a sequence of operations for the host and/or target element of FIG. 1, 3, or 4 to determine whether to issue DMA requests for data required by a particular task or portion thereof.

Embodiments of the invention, whether utilized with a data streaming infrastructure or not, are also configured to proactively analyze at least a portion of a data stream and determine whether data stream views required for execution thereof is in a local memory. When a required data stream view is not in the local memory of a target element, DMA requests are proactively issued. The DMA requests are, in turn, tracked in buffer groups at the target element. The number of buffer groups used to track data stream views, and thus data streams, may be dynamically changed depending upon circumstances of the computing system upon which embodiments of the invention are configured. FIG. 11 is a flowchart 300 illustrating a sequence of operations for a target element of a parallel computing system to proactively issue DMA requests for data stream views of a data stream and track those DMA requests in a buffer group consistent with embodiments of the invention. In particular, information associated with a data stream is analyzed to determine the status of at least one data stream view required for execution thereby (block 302). The target element then determines whether the at least one data stream view required for execution is stored in local memory (e.g., local to the target element) and whether a buffer group for the at least one data stream view is ready (block 304). When the at least one data stream view required for execution is stored in the local memory and a buffer group for the data stream is ready ("Yes" branch of decision block 304), the target element processes the at least one data stream view of the data stream (block 306) and determines whether processing of the data stream is complete (block 307). When processing of the data stream is not complete (e.g., one or more data stream views for the data stream have not been transferred) ("No" branch of decision block 307), the sequence of operations returns to block 304. However, when processing of the data stream is complete (e.g., each of the data stream views of the data stream have been processed) ("Yes" branch of decision block 307), the target element analyzes the next data stream to determine at least one data stream view required for execution thereby (block 308) and the sequence of operations proceeds back to block 304.

Returning to block 304, when the at least one data stream view required for execution of the data stream is not stored in the local memory or when a buffer group for the data stream is not ready (e.g., there is no buffer group for the data stream) ("No" branch of decision block 304), the target element determines whether a buffer group for the data stream exists (block 309). When a buffer group for the data stream does not exist ("No" branch of decision block 309), the target element determines whether it can create a buffer group to store information about DMA requests for the at least one data stream view required to for the data stream (block 310). In particular, a buffer group may be created when a predetermined number of buffer groups have not already been created, when a buffer group counter has exceeded a predetermined threshold, when there is memory available to create the buffer group, and/or when there is a DMA channel available to issue the DMA requests for the at least one data stream view, as discussed below. In any event, when a buffer group can be created ("Yes" branch of decision block 310), the target element creates the buffer group and adds data associated with the buffer group to a buffer group list (block 312), proactively issues at least one DMA request for the at least one data stream view required for execution by the at least a portion of the task and tracks each issued DMA request in the buffer group (block 314), and decrements the buffer group counter (block 316). The sequence of operations then proceeds back to block 304. However, when a buffer group cannot be created ("No" branch of decision block 310), the target element increments the buffer group counter (block 318). Returning to block 309, when a buffer group for the data stream does exist ("Yes" branch of decision block 309), the sequence of operations proceeds to block 314 and proceeds as discussed above.

Figure 12:
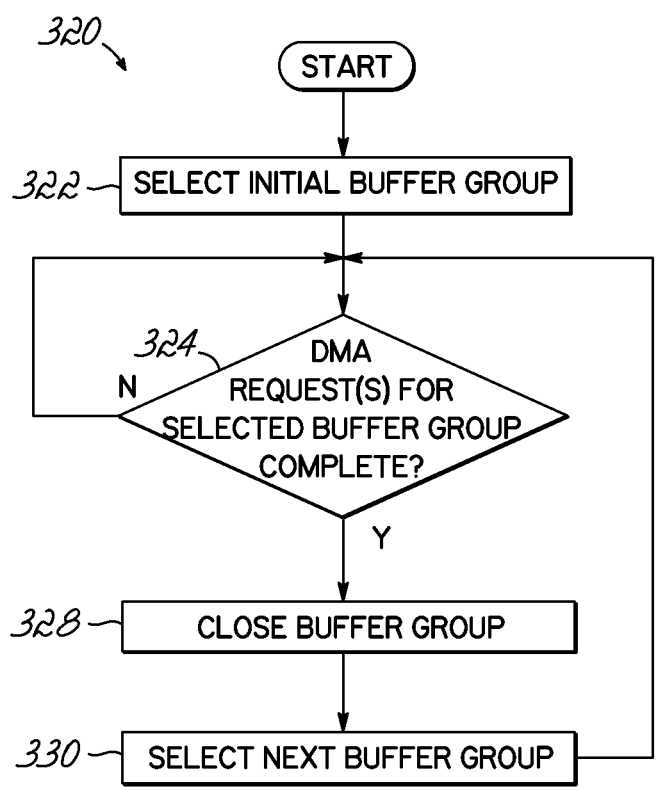
FIG. 12 is a flowchart illustrating a sequence of operations for the host and/or target element of FIG. 1, 3, or 4 to track DMA requests in a buffer group object and close that buffer group object when all DMA requests tracked thereby have completed.

FIG. 12 is a flowchart 320 illustrating a sequence of operations for the target element to determine whether to close a buffer group consistent with embodiments of the invention. In particular, the target element selects the initial buffer group in a buffer group list (block 322) and determines whether each DMA request for the selected buffer group has completed (e.g., each DMA request for at least one data stream view of the data stream associated with the buffer group has been fulfilled) (block 324). When each DMA request for the selected buffer group has completed ("Yes" branch of decision block 324), the target element closes the buffer group (block 328) and selects the next buffer group in the buffer group list (block 330). Returning to block 324, when each DMA request for the selected buffer group has not completed ("No" branch of decision block 324), the sequence of operations returns to block 324.

Figure 13:
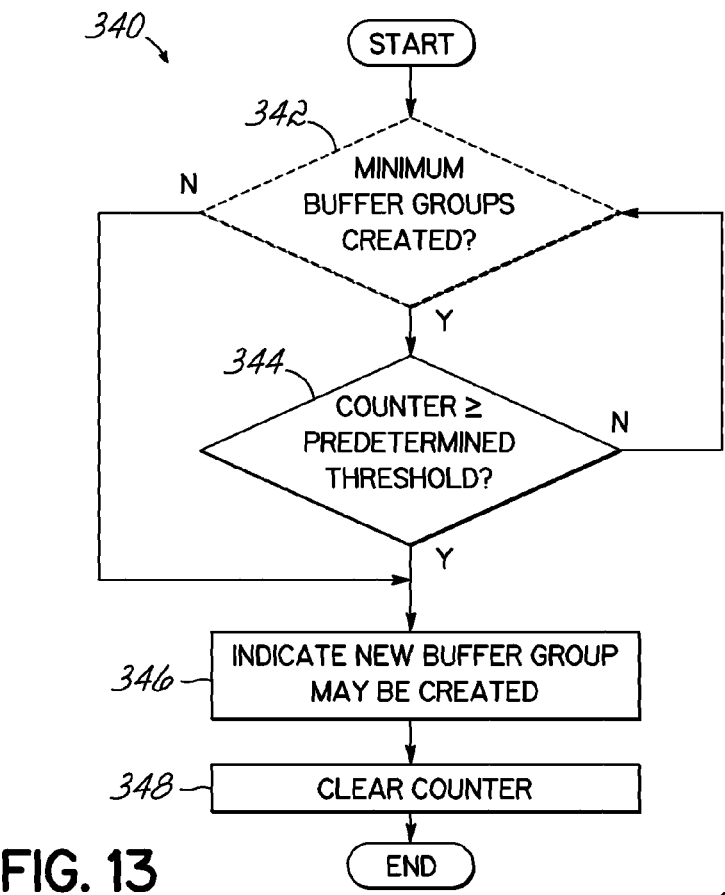
FIG. 13 is a flowchart illustrating a sequence of operations for the host and/or target element of FIG. 1, 3, or 4 to determine whether to create a new buffer group objects to track DMA requests.

As indicated above, a buffer group may be created when a buffer group counter has exceeded a predetermined threshold, when there is memory available to create the buffer group, and/or when there is a DMA channel available to issue the DMA requests for at least one data stream view of a data stream. FIG. 13 is a flowchart 340 for a target element to indicate that a new buffer group may be created when a predetermined number of buffer groups have not already been created or when the buffer group counter is above a predetermined threshold consistent with embodiments of the invention. As such, and in an optional operation, the target element determines whether the minimum number of buffer groups have been created (block 342). When the minimum number of buffer groups have been created ("Yes" branch of decision block 342), the target element determines whether buffer the group counter is above the predetermined threshold (block 344). When the minimum number of buffer groups has not been created ("No" branch of decision block 342) or when the buffer group counter is above the predetermined threshold ("Yes" branch of decision block 344), the target element indicates that a new buffer group may be created (block 346), clears the buffer group counter (block 348), and the sequence of operations may end. However, when the buffer group counter is not above a predetermined threshold ("No" branch of decision block 344), the sequence of operations may return to block 342.

Figure 14:
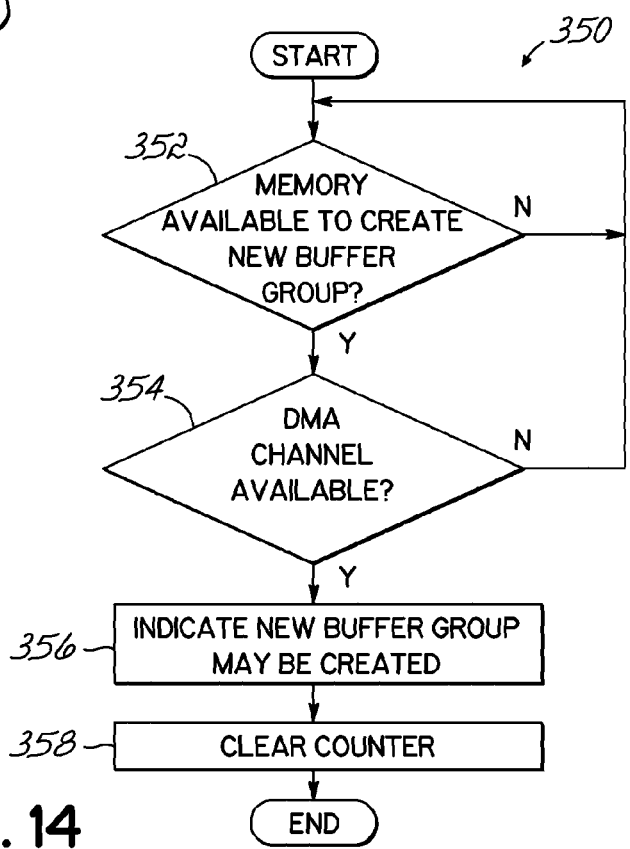
FIG. 14 is a flowchart illustrating a sequence of operations for the host and/or target element of FIG. 1, 3, or 4 to determine whether to create a new buffer group objects to track DMA requests.

FIG. 14 is a flowchart 350 for a target element to indicate that a new buffer group may be created when there is available memory and an available DMA channel consistent with embodiments of the invention. In particular, the target element initially determines whether there is enough memory on the target element to create a new buffer group (block 352). When there is enough memory ("Yes" branch of decision block 352), the target element determines whether there is a DMA channel available (block 354). When there is a DMA channel available ("Yes" branch of decision block 354), the target element indicates that a new buffer may be created (block 356), clears the buffer group counter (block 358), and the sequence of operations may end. However, when there is not enough memory ("No" branch of decision block 352) or when there is no DMA channel available ("No" branch of decision block 354), the sequence of operations may return to block 352.

As discussed above, each buffer group may track the DMA requests associated with respective portions of one or more tasks. FIG. 13 and FIG. 14 illustrate sequences of operations that may be used to determine whether to create buffer groups, and thus manage the number of buffer groups. In this manner, the computing system may be configured to have a predetermined number of buffer groups and/or a dynamic number of buffer groups.

While embodiments of the present invention have been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. For example, the computer 10 of FIG. 1, the shared memory computing system 50 of FIG. 3, and/or the system 80 of FIG. 4 may include additional components, such as displays, I/O devices, routers, and/or other components without departing from the scope of the invention. Moreover, each of the nodes of the shared memory computing system 50 of FIG. 3 or system 80 of FIG. 4 may be configured with more than one core as is well known in the art. Still further, embodiments of the invention are discussed in connection with input data streams. However, alternative embodiments of the invention may be used in connection with output data streams as well.

Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the present invention. Accordingly, departures may be made from such details without departing from the scope of applicants' general inventive concept.

The invention lies in the claims hereinafter appended.

What is claimed is:

1. A method of streaming data between a host element and a target element in a parallel computing system, the method comprising, in the host element:
   partitioning data used to perform a task into a plurality of data streams based at least in part upon data associated with the task;
   partitioning a data stream from the plurality of data streams into a plurality of data stream views based at least in part on a memory size associated with the target element configured to process the data stream, wherein partitioning the data stream based at least in part on the memory size associated with the target element includes dynamically configuring sizes of the plurality of data stream views to fit within an amount of memory available in the target element for processing data stream views; and sequentially communicating at least a portion of the plurality of data stream views to the target element via a data streaming infrastructure implemented on at least the host element and the target element, wherein a first portion of the data streaming infrastructure configured on the host element transfers the portion of the plurality of data stream views to a second portion of the data streaming infrastructure configured on the target element.

2. The method of claim 1, wherein the parallel computing system includes a plurality of target elements.

3. The method of claim 2, wherein the plurality of data streams includes at least one data stream for each of the plurality of target elements.

4. The method of claim 2, wherein the target element is a first target element, the data stream if a first data stream, and the plurality of data stream views is a first plurality of data stream views, the method further comprising:

partitioning a second data stream from the plurality of data streams into a second plurality of data stream views based at least in part on a memory size associated with a second target element configured to process the second data stream; and sequentially communicating at least a portion of the second plurality of data stream views to the second target element via the data streaming infrastructure, wherein a third portion of the data streaming infrastructure configured on the second target element receives the portion of the second plurality of data stream views.

5. The method of claim 4, further comprising:
dynamically switching the communication of the at least a portion of the second plurality of data stream views to the first target element via the data streaming infrastructure.

6. The method of claim 2, wherein the data stream is a first data stream and the plurality of data stream views is a first plurality of data stream views, the method further comprising:

partitioning a second data stream from the plurality of data streams into a second plurality of data stream views based at least in part on the memory size associated with the target element and the memory size of a data stream view of the first plurality of data stream views; and sequentially communicating at least a portion of the second plurality of data stream views to the target element via the data streaming infrastructure.

7. The method of claim 2, wherein the target element is a first target element and partitioning the data stream includes:

partitioning a first portion of the data stream into a first group of data stream views based at least in part on a memory size associated with the first target element; and partitioning a second portion of the data stream into a second group of data stream views based at least in part on a memory size associated with a second target element.

8. The method of claim 7, wherein sequentially communicating the portion of the data stream views includes:

sequentially communicating the first group of data stream views to the first target element via the data streaming infrastructure; and sequentially communicating the second group of data stream views to the second target element via the data streaming infrastructure, wherein a third portion of the data streaming infrastructure configured on the second target element receives the second group of data stream views.

9. The method of claim 1, wherein partitioning the data used to perform the task into the plurality of data streams is additionally based on data associated with the task.

10. The method of claim 1, wherein each data stream view of the plurality of data stream views is configured to have a size corresponding to the amount of memory available to the target element to process the respective data stream views.

11. The method of claim 10, wherein the target element processes a first data stream view of the at least a portion of the plurality of data stream views followed by a second data stream view of the at least a portion of the plurality of data stream views without maintaining data from the first data stream view for processing with the second data stream view.

12. The method of claim 1, wherein each data stream view of the plurality of data stream views is configured to have a size smaller than the amount of memory available to the target element to process the respective data stream views.

13. The method of claim 12, wherein the target element processes a first data stream view of the at least a portion of the plurality of data stream views followed by a second data stream view of the at least a portion of the plurality of data stream views while maintaining data from the first data stream view for processing with the second data stream view.

14. The method of claim 1, further comprising:
sequentially communicating, in reverse order, the at least a portion of the plurality of data stream views to the target element via the data streaming infrastructure in response to the target element processing the at least a portion of the data stream views.

15. The method of claim 1, wherein the first portion of the data streaming infrastructure is configured as an application layer on the host element.

16. The method of claim 1, wherein the first portion of the data streaming infrastructure is configured by the task.

17. A parallel computing system, comprising:
a host element;
at least one target element having an amount of memory available for processing data stream views; and
program code configured to be executed by the host element to partition data used to perform a task into a plurality of data streams based at least in part upon data associated with the task, partition a data stream from the plurality of data streams into a plurality of data stream views based at least in part on a memory size associated with the target element configured to process the data stream, and sequentially communicate at least a portion of the plurality of data stream views to the target element via a data streaming infrastructure implemented on at least the host element and the target element, wherein a first portion of the data streaming infrastructure configured on the host element transfers the portion of the plurality of data stream views to a second portion of the data streaming infrastructure configured on the target element, and wherein the program code is configured to partition the data stream based at least in part on the memory size associated with the target element by dynamically configuring sizes of the plurality of data stream views to fit within the amount of memory available in the target element for processing data stream views.

18. The system of claim 17, wherein the each data stream view of the plurality of data stream views is configured to have a size corresponding to the amount of memory available to the target element to process the respective data stream views.

19. The system of claim 18, wherein the target element processes a first data stream view of the at least a portion of the plurality of data stream views followed by a second data stream view of the at least a portion of the plurality of data stream views without maintaining data from the first data stream view for processing with the second data stream view.

20. The system of claim 17, wherein each data stream view of the plurality of data stream views is configured to have a size smaller than the amount of memory available to the target element to process the respective data stream views.

21. The system of claim 20, wherein the target element processes a first data stream view of the at least a portion of the plurality of data stream views followed by a second data stream view of the at least a portion of the plurality of data stream views while maintaining data from the first data stream view for processing with the second data stream view.

22. The system of claim 17, further comprising:
a node containing the host element and target element.

23. A program product, comprising:
program code configured upon execution to partition data used to perform a task into a plurality of data streams based at least in part upon data associated with the task, partition a data stream from the plurality of data streams into a plurality of data stream views based at least in part on a memory size associated with a target element configured to process the data stream, and sequentially communicate at least a portion of the plurality of data stream views to the target element via a data streaming infrastructure implemented on at least a host element and the target element, wherein a first portion of the data streaming infrastructure configured on the host element transfers the portion of the plurality of data stream views to a second portion of the data streaming infrastructure configured on the target element, wherein the program code is configured to partition the data stream based at least in part on the memory size associated with the target element by dynamically configuring sizes of the plurality of data stream views to fit within an amount of memory available in the target element for processing data stream views; and
a computer readable medium bearing the program code, wherein the medium is not a signal.

* * * * *